July 13, 1965 J. R. REINHART ETAL 3,194,285
SAW FOR TRIMMING DOORS AND THE LIKE
Filed June 13, 1963
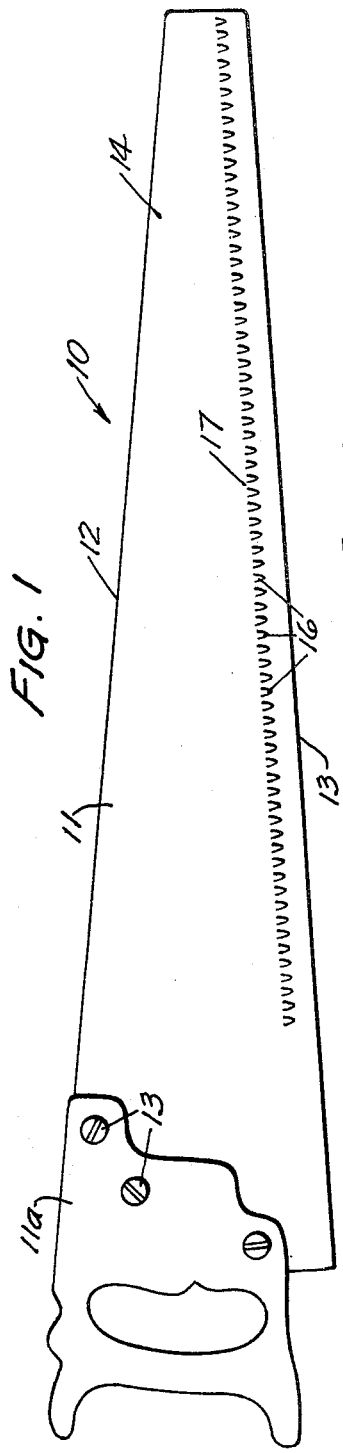
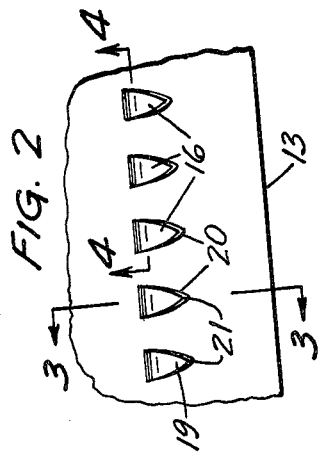
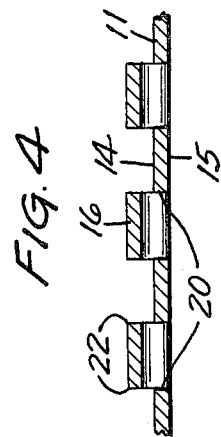
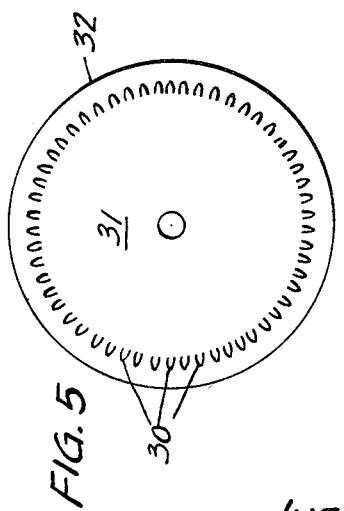
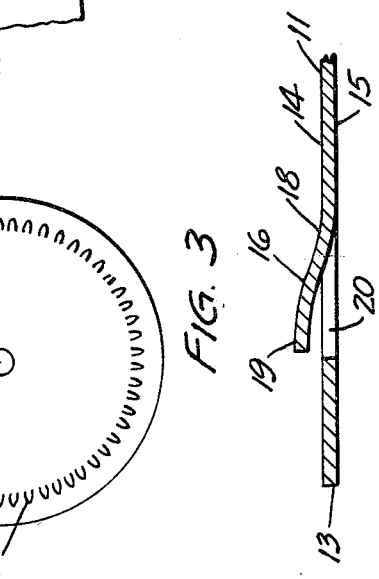
INVENTORS
JUEL R. REINHART
GERALD L. REINHART
BY
Williamson & Palmatier
ATTORNEYS

United States Patent Office 3,194,285
Patented July 13, 1965

3,194,285
SAW FOR TRIMMING DOORS AND THE LIKE
Juel R. Reinhart and Gerald L. Reinhart, both of Rte. 2, Crookston, Minn.
Filed June 13, 1963, Ser. No. 287,566
5 Claims. (Cl. 145—31)

This invention relates to a saw for use in trimming doors and the like without necessitating removal therefrom.

An object of our invention is to provide a saw of simple and inexpensive construction and operation for cutting or trimming a workpiece to a predetermined extent in relation to a physical stop or abutment.

Another object of our invention is to provide a novel hand-operated saw with a flexible blade which may be readily and easily employed for trimming and cutting one workpiece to a size so that it will fit properly adjacent a second part without causing any physical damage to or mutilation of the second part, such as in the situation where a door is to be trimmed with respect to the sill or frame without necessitating removal of the door from its installed location.

These and other objects and advantages of our invention will more fully appear from the following description made in connection with the accompanying drawings wherein like reference characters refer to similar parts throughout the several views and in which:

FIG. 1 is an elevation view of the invention;
FIG. 2 is an enlarged detail elevation;
FIG. 3 is an enlarged detail section view taken approximately at 3—3 in FIG. 2;
FIG. 4 is an enlarged detail section view taken approximately at 4—4 in FIG. 2;
FIG. 5 is an elevation view of a circular saw blade embodying the present invention.

One form of the present invention is shown in the drawings and is described herein. The saw is indicated in general by numeral 10 and includes an elongate blade 11 constructed of resiliently flexible steel similar to the material in a conventional carpenter's hand saw. The saw also includes a handle 12 affixed as by bolts 13 to the saw blade 11.

The saw blade 11 has longitudinally extending juxtaposed edges 12 and 13 which are smooth and unobstructed and will readily move along a guide without damaging or mutilating the guide. The blade 11 has a top surface 14 and a bottom surface 15, and it will be noted that the bottom surface 15 is smooth and uniform and completely unobstructed so that the bottom surface 15 may engage and move along a guide, as the sill or frame of a door so that the guide or sill will be neither marred, mutilated or damaged in any respect.

The upper surface 14 is also smooth and unobstructed except for a plurality of teeth 16 oriented in a row 17 extending longitudinally along the blade 11 and parallel to the edge 13 to which the row 17 is closest as illustrated in FIGS. 3 and 4, each of the teeth 16 has a rear portion 18 formed integrally of the blade 11, and has a front portion 19 which is formed integrally of the rear portion of the tooth but is offset with respect to the blade 11 and is disposed slightly above the top surface 14 of the blade. Each of the teeth 16 is formed by cutting the tooth directly from the material of the blade 14 and then offsetting the tooth in an upward direction so that the front cutting portion of the tooth lies above the top surface 14. The blade 11 has a plurality of apertures 20 therein, each aperture confronting a corresponding tooth 16 with the periphery of the aperture being spaced from the tooth so as to permit sawdust and the like to enter the aperture 20 during cutting and be carried away by the aperture from the point of cutting and thereby prevent clogging at the area of cutting.

It will be noted, as viewed in FIG. 2, that the front portion 19 of each of the teeth is substantially V-shaped and that the V-shape of the front portion converges in a direction generally transversely of the blade and toward the edge 13 thereof. The V-shaped front portion 19 of each tooth defines a cutting edge 21, and furthermore, the top side edges 22 of the teeth are also sharp to effect cutting.

In operation, the saw 10 is particularly useful in trimming the edges of a door for a room or building without removing the door from its hinges and particularly in trimming the bottom edge of the door with respect to the sill. It should be understood that trimming of a door is oftentimes necessary during original installation and adjustment thereof and is oftentimes desirable or necessary to prevent such a door from sticking due to its expansion as a result of humidity or other weather conditions. The tip end of the blade 11 can ordinarily be worked under the door and over the sill at some location along the sill. Although the sill is at floor level, manual gripping of the handle 12 is possible and easily accomplished by merely flexing the blade 11 slightly so as to elevate the position of the handle 12 from the floor of the room. It is preferable to intentionally flex the blade 11 at a location spaced from the point of engagement by the blade with the door so that the saw blade 11 at the location of engagement with the door can remain substantially normal to the plane of the door or level with the floor.

The saw will then be longitudinally oscillated and the teeth 16 will produce trimming and cutting of the edge portion of the door while the bottom surface 15 of the blade merely rides on the sill and guides and holds the teeth in engagement with the door to effect the cutting action. It will be understood that the blade will be progressively moved along the sill as the door is trimmed and the door will ultimately be spaced substantially equal all across its width from the sill and thereby prevent further sticking of the door.

It will be understood that the size of teeth 16 may be varied over a considerable range. Smaller teeth than those illustrated and more numerous in number will produce a finer cutting action, and of course the teeth may be enlarged to produce a coarser and quicker cutting action. In the event the teeth are dulled, the edges 21 and 22 may be readily sharpened.

It will be seen that we have provided a new and novel saw effecting cutting at one side only thereof to permit cutting of a workpiece to a certain predetermined spacing with a guide along which the saw is moved without mutilating the guide, such as in the situation of trimming a door away from a sill.

It should be understood that although the present invention is illustrated in FIGS. 1–4 and was previously described in connection with hand saws, FIG. 5 illustrates the provision of cutting teeth 30 similar to that described and in a rotary saw blade 31 to be operated by an electric motor. The circular saw blade 31 has a smooth peripheral edge 32 with the teeth 30 formed inwardly of the peripheral edge 32 thereof.

It will, of course, be understood that various changes may be made in the form, details, arrangement and proportions of the parts without departing from the scope of our invention which consists of the matter shown and described herein and set forth in the appended claims.

What we claim is:

1. A saw applicable in trimming the edge of a door adjacent the sill and without removing the door,
   comprising an elongate flexible blade having handle means thereon, said blade having juxtaposed longitudinally extending edges, and also having a top surface and a smooth and unobstructed bottom surface engageable with the sill of such a door and movable while in engagement with the sill without mutilating and damaging the sill;

said blade having a plurality of teeth in a row disposed between said edges, each of said teeth having a rear portion formed integrally with the blade and having side and front portions formed integrally with said rear portion but separated from the blade and located at a position above said top surface of the blade, each of said teeth extending from said rear portion toward one of said edges and having sharpened edges to engage and trim the edge of such a door when the blade is longitudinally oscillated with said unobstructed bottom surface of the blade engaging and moving along the sill and without damaging the sill.

2. A saw applicable in trimming the edge of a door adjacent the sill and without removing the door, comprising an elongate flexible blade having a handle on one end thereof, said blade having juxtaposed longitudinally extended edges and also having a top surface and a smooth and unobstructed bottom surface engageable with the sill of a door and movable along the sill without mutilating and damaging the sill, said blade having a plurality of teeth in a row extending along one of said edges and in spaced relation therewith, each of said teeth having a rear portion formed integrally with the blade and having a front portion formed integrally with said rear portion and elevated to a position above the top surface of the blade, the front portion of each of the teeth extending transversely of the elongate blade and toward said last mentioned edge, the front portion of each of said teeth having a convergent and generally pointed shape and having sharpened edges to engage and trim such a door when the blade is laid on the sill and flexed to permit continued manual gripping of said handle means while trimming the door with said unobstructed bottom surface of the blade moving along the sill without damaging the sill, and said blade having a plurality of apertures therein each confronting a corresponding tooth and having a periphery in spaced relation with the front portion of the corresponding tooth to permit the aperture to receive during cutting, sawdust produced as a result of cutting by the corresponding tooth.

3. A saw blade for use as in trimming the edge of a door adjacent the sill and without removing the door, comprising a blade having a substantially smooth and unobstructed edge, said blade also having a top surface and a smooth and unobstructed bottom surface engageable with the sill of such a door and movable while in engagement with the sill without mutilating and damaging the sill, said blade having a plurality of teeth in a row disposed in spaced relation with said edge, each of said teeth having a rear portion formed integrally with the blade and having side and front portions formed integrally with said rear portion but separated from the blade and located at a position above said top surface of the blade, each of said teeth extending from said rear portion toward said edge and each of said teeth having sharpened edges to engage and trim the edge of such a door when the blade is moved relative to the door with said unobstructed bottom surface of the blade adjacent to and moving along the sill.

4. The invention set forth in claim 3 wherein said blade has a circular configuration and said edge extends peripherally of the blade.

5. The invention set forth in claim 3 wherein said blade is elongate and said edge extends substantially linearly.

References Cited by the Examiner
UNITED STATES PATENTS

| | | | |
|---|---|---|---|
| 300,805 | 6/84 | Scott | 143—140 |
| 301,841 | 7/84 | Troeme-Becker | 143—140 |
| 1,550,976 | 8/25 | Loughlin | 145—113 |

WILLIAM FELDMAN, *Primary Examiner.*

MILTON S. MEHR, *Examiner.*